US012059754B2

(12) United States Patent
Schmitz et al.

(10) Patent No.: US 12,059,754 B2
(45) Date of Patent: Aug. 13, 2024

(54) SMART DRIVE ROLL ASSEMBLY

(71) Applicant: Illinois Tool Works Inc., Glenview, IL (US)

(72) Inventors: Adam Richard Schmitz, Appleton, WI (US); Chris J. Roehl, Appleton, WI (US); Scott Ryan Rozmarynowski, Greenville, WI (US); Zachary William MacMullen, Larsen, WI (US); Lauren Goulet, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/728,341

(22) Filed: Apr. 25, 2022

(65) Prior Publication Data

US 2023/0015497 A1     Jan. 19, 2023

Related U.S. Application Data

(63) Continuation of application No. 15/802,185, filed on Nov. 2, 2017, now abandoned.

(51) Int. Cl.
    *B23K 9/133*     (2006.01)
    *B23K 9/095*     (2006.01)
    *B23K 9/173*     (2006.01)

(52) U.S. Cl.
    CPC .......... *B23K 9/1336* (2013.01); *B23K 9/0956* (2013.01); *B23K 9/173* (2013.01)

(58) Field of Classification Search
    CPC ...... B23K 9/095; B23K 9/0953; B23K 9/133; B23K 9/1333; B23K 9/1336; B23K 9/173;
(Continued)

(56) References Cited

U.S. PATENT DOCUMENTS

| 4,068,106 A | 1/1978 | Shaputis |
| 9,144,862 B2 | 9/2015 | Hemmert et al. |

(Continued)

FOREIGN PATENT DOCUMENTS

| CN | 101702899 | 5/2010 |
| CN | 204262586 | 4/2015 |
| WO | 2013164674 | 11/2013 |

OTHER PUBLICATIONS

PCT Invitation to Pay Additional Fees and Annex to Form PCT/ISA/206 Partial International Search Report, for International Application No. PCT/US2018/058439, mailed Mar. 13, 2019, 12 pages.

(Continued)

*Primary Examiner* — Justin C Dodson
(74) *Attorney, Agent, or Firm* — McAndrews, Held & Malloy, Ltd.

(57) ABSTRACT

Systems and methods are provided for manually setting up a wire drive assembly of a welding power supply and automatically setting up welding power supply parameters. A drive roll is configured with multiple grooves for receiving multiple wires of different types and/or different diameters. A sensor can detect the configuration of the drive roll such as, for example, being configured to receive a particular wire type with a particular diameter in a particular groove, by detect a distance to the drive roll. The welding power supply can use this information to automatically set the wire speed.

11 Claims, 11 Drawing Sheets

(58) Field of Classification Search
CPC ..... B23K 11/25; B23K 11/251; B23K 11/252; B23K 11/253; B23K 11/255; B23K 11/256; B23K 35/00
See application file for complete search history.

(56) References Cited

U.S. PATENT DOCUMENTS

| | | |
|---|---|---|
| 2008/0035625 A1 | 2/2008 | Ertmer |
| 2014/0151350 A1* | 6/2014 | Hemmert ............ B23K 9/0956 219/137.7 |
| 2015/0014383 A1* | 1/2015 | Patterson ............... B65H 51/32 29/464 |
| 2016/0121420 A1* | 5/2016 | Denis ........................ G01P 3/48 324/166 |
| 2017/0209951 A1 | 7/2017 | Patterson et al. |

OTHER PUBLICATIONS

Wang, Xiubing, "Narrow Gap Submerged Arc Welding Wire Oscillation System Based on PLC is Designed", China Doctor/Master Dissertation Full-Text Database (Master) Engineering Technology Part 1, No. 4, Apr. 15, 2014 (A type reference).
European Office Communication Appln No. 18804476.2 dated Dec. 15, 2021.
European Patent Office, Search Report, Application No. 23156919.5, dated May 26, 2023, 7 pages.

* cited by examiner

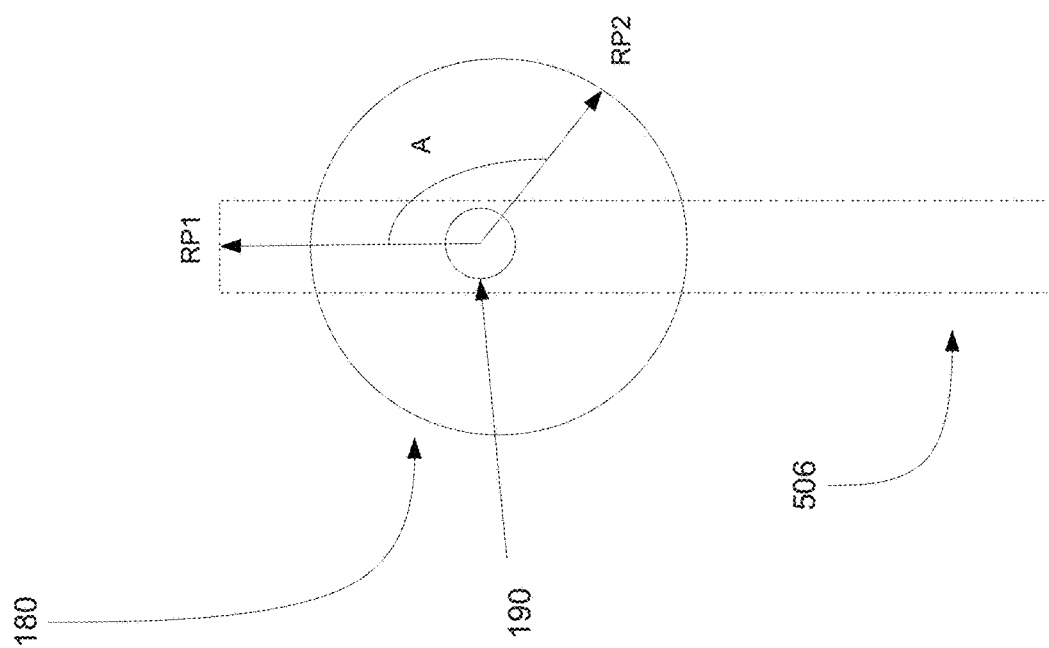

SMART DRIVE ROLL ASSEMBLY

BACKGROUND

Properly setting up a welding power supply can require the completion of a number of manual operator tasks that must be performed correctly if the welding operation is to succeed.

For example, a welding power supply can be equipped with a wire spool and a drive assembly. The drive assembly can include, for example, a drive roll that must be mounted and correctly set up with the welding wire from the wire spool based on the wire diameter and/or wire type (e.g., solid wire, flux-cored wire, etc.).

Further, the operator may have to manually set many welding parameters on the power supply including, for example, a workpiece material thickness, a voltage, a wire speed, and a wire diameter for a corresponding welding operation.

Incorrectly setting up the drive assembly or any of the welding parameters for the corresponding welding operation can have an adverse effect on the welding operation.

BRIEF SUMMARY

Systems and methods are provided for setting up a welding power supply including a wire drive assembly substantially as illustrated by and/or described in connection with at least one of the figures, as set forth more completely in the claims.

BRIEF DESCRIPTION OF THE DRAWINGS

FIG. 6b shows a simplified top down view of the wire drive assembly of FIG. 6a, illustrating angle detection.

FIG. 7b shows a perspective view of an example drive roll carrier receiving a drive roll in the wire drive assembly of FIG. 7a.

DETAILED DESCRIPTION

Figure 1:
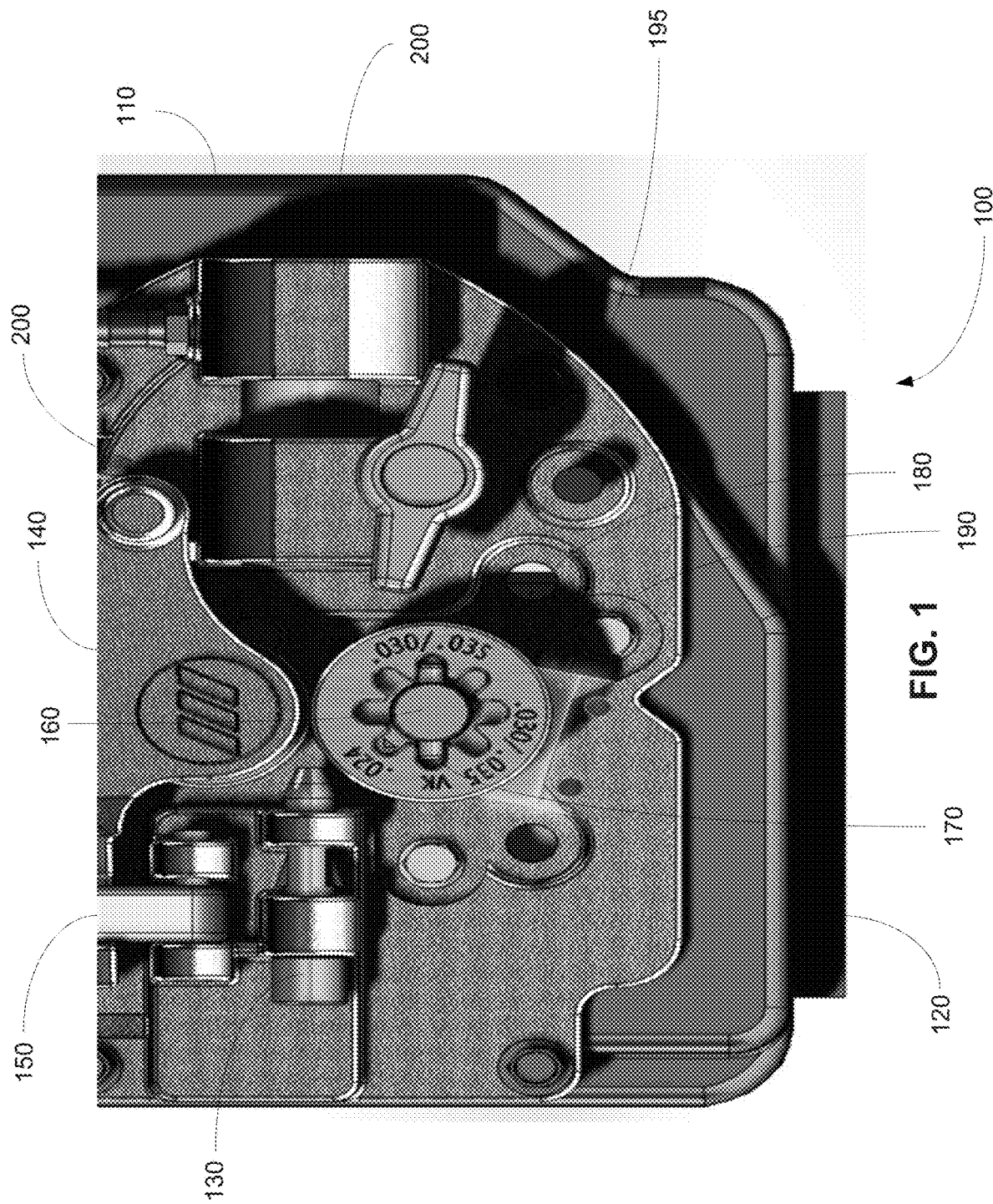
FIG. 1 shows top view of a wire drive assembly according to an example of the present disclosure.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

As utilized herein, the terms "e.g." and "for example" set off lists of one or more non-limiting examples, instances, or illustrations.

As used herein, the term "coupled" means attached, affixed, connected, joined, fastened, linked, and/or otherwise secured.

Some examples according to the present disclosure may relate to a wire drive assembly comprising a drive roll having a plurality of configurations and a sensor configured to detect which of the configurations has been set based on a distance to the drive roll.

In some examples, the wire drive assembly may be configured to receive a wire having at least one of a wire diameter or a wire type, and the sensor may be configured to detect at least one of the wire diameter or the wire type based on the distance to the drive roll. In some examples, the drive roll may be configured with a first groove and a second groove. The first groove may be configured to receive a first wire having a first diameter, and the second groove is configured to receive a second wire having a second diameter. In some examples, the sensor may be configured to determine whether the drive roll has been set to receive the first wire having the first diameter or the second wire having the second diameter based on the distance to the drive roll. In some examples, the drive roll may be configured with a first groove and a second groove, and the first groove may be configured to receive a first type of wire, while the second groove may be configured to receive a second type of wire. In some examples, the sensor is configured to detect whether the drive roll has been set to receive the first type of wire or the second type of wire based on the distance to the drive roll. In some examples, the first type of wire may be a solid wire, and the second type of wire may be a flux-cored wire. In some examples, the drive roll may have a plurality of slots, and each of the plurality of slots may correspond to one of the plurality of configurations. In some examples, the drive roll may be installed on a drive shaft with a pin, and the pin may engage with one of the plurality of slots to set one of the plurality of configurations. In some examples, the drive roll may be set at a particular location on the drive shaft when the pin engages with one of the plurality of slots.

Some examples according to the present disclosure may be related to a wire drive assembly, comprising a drive roll with a plurality of configurations relating to receiving different types of wire on different grooves, and a sensor configured to detect which of the configurations has been set based on an angle through which the drive roll is rotated in setting one of the plurality of configurations. Some examples according to the present disclosure may be related to a welding power supply comprising a wire drive assembly that includes a drive roll having a plurality of configurations, and a sensor configured to detect which of the configurations has been set based on a distance to the drive roll. The welding power supply may further comprise one or more processors operatively coupled to the sensor.

In some examples, the one or more processors may be configured to automatically determine which of the configurations has been set based on a signal received from the sensor. In some examples, the drive roll may be configured to receive different wires with different diameters, and the sensor may be configured to detect the diameter of the wire based on a distance to the drive roll. In some examples, the one or more processors may be configured to determine the diameter of the wire based on the signal received from the sensor, and the one or more processors may be configured to automatically set a wire speed based on the diameter of the wire. In some examples, the drive roll may be configured to receive different types of wire, and the sensor may be configured to sense a type of wire based on a distance to the drive roll. In some examples, the drive roll may be configured with a first groove and a second groove. The first groove may be configured to receive a first wire having a first diameter, and the second groove may be configured to receive a second wire having a second diameter. In some examples, the sensor may be configured to determine whether the drive roll has been set to receive the first wire having the first diameter or the second wire having the second diameter based on the distance to the drive roll. In some examples, the drive roll may be configured with a first groove and a second groove, where the first groove is configured to receive a first type of wire, and the second groove is configured to receive a second type of wire. In some examples, the drive roll may have a plurality of slots, and one of the plurality of slots may correspond to one of the plurality of configurations.

Figure 2:
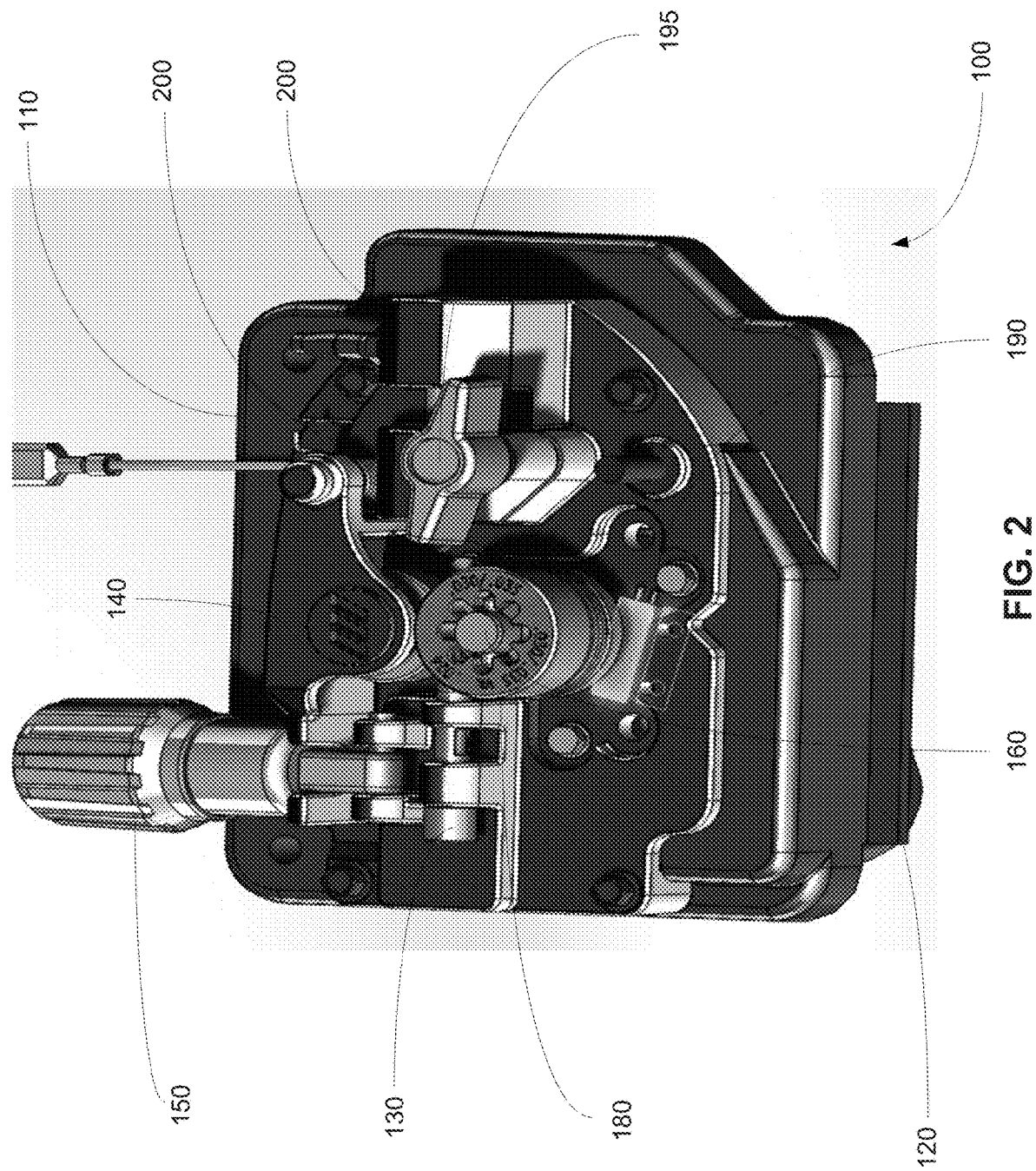
FIG. 2 shows an angled view of the wire drive assembly shown in FIG. 1.

FIGS. 1 and 2 show an example of a wire drive assembly 100 according to the present disclosure from a top view and an angled view, respectively. The wire drive assembly 100 can be coupled to a wire spool (not shown). Further, the wire drive assembly 100 and the wire spool can be part of a welding power supply used in welding operations such as welding, metal inert gas (MIG) welding, gas metal arc welding (GMAW), and/or flux-cored arc welding, for example. However, the present disclosure also contemplates that the wire drive assembly 100 can be separate from the welding power supply or can be used for other applications that use a wire drive assembly.

Some examples provide that the wire drive assembly 100 includes, for example, a housing 110 (e.g., an insulator and/or aluminum drive housing), a motor 120 (e.g., a gear motor), an inlet wire guide 130, a pressure roll lever 140, a pressure adjustment knob 150 (e.g., a calibrated tension knob that is configured to provide consistent wire feed and/or set drive roll pressure), a drive shaft 160, a retaining pin 170, a drive roll 180, a sensor 190 (e.g., a proximity sensor, a distance sensor, a change-in-distance sensor, an angle sensor, a change-in-angle sensor, a movement sensor, an optical sensor, an ultrasonic sensor etc.), a T-knob 195 (e.g., welding gun/torch securing knob), and welding gun/torch guides 200.

Figure 3:
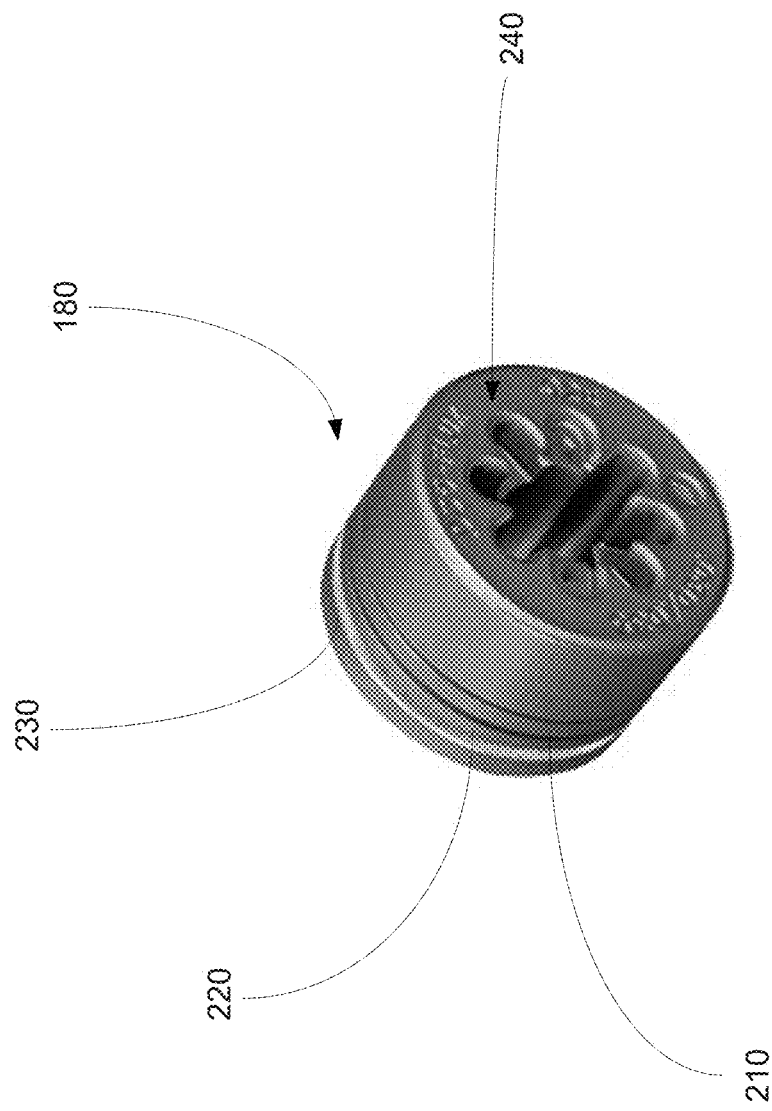
FIG. 3 shows a perspective view of a drive roll according to an example of the present disclosure.

FIG. 3 shows a perspective view of an example of the drive roll 180 according to the present disclosure. The drive roll 180 is configured with multiple feed grooves to facilitate quick and easy switching between different welding wire diameters and/or different wire types. Referring to FIG. 3, the drive roll 180 is shown with an exemplary three feed grooves 210, 220, 230. In some examples, the first feed groove 210 is for 0.024" diameter solid wire; the second feed groove 220 is for 0.030"-0.035" diameter solid wire; and the third feed grove 230 is a V-knurled groove for 0.030"-0.035" diameter flux-cored wire. The drive roll 180 also has multiple slots 240 that are configured to work with the retaining pin 170 and the drive shaft 160.

Figure 4:
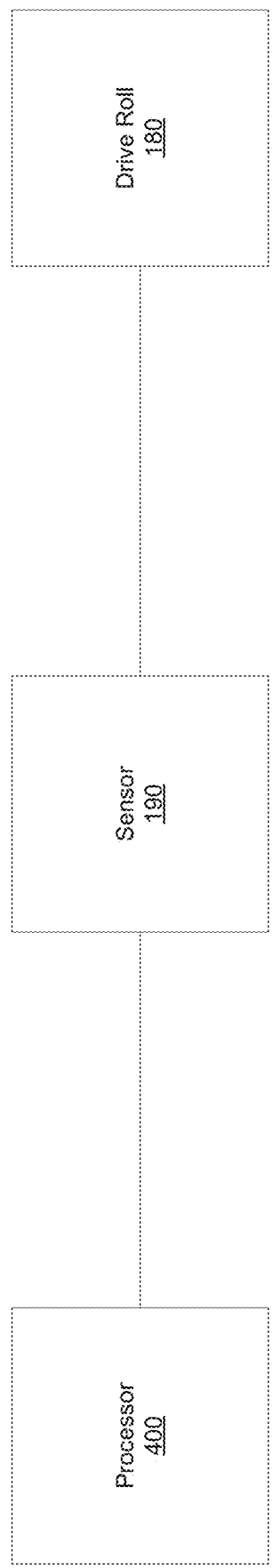
FIG. 4 shows a block diagram illustrating a functionality of the wire drive assembly according to an example of the present disclosure.

FIG. 4 shows a block diagram illustrating some of the functionality of the wire drive assembly 100, according to an example of the present disclosure. In the example, the sensor has a functional connection with the drive roll 180, in that the sensor 190 may detect a configuration of the drive roll 180. The sensor 190 also has a functional connection with a processor 400, in that the sensor 190 may communicate the detected drive roll 180 configuration to the processor 400. The communication may be in the form of an electrical signal, for example. The communication may be over a communication bus, through a wireless transmission (e.g. radio frequency, Bluetooth, WiFi, LTE, etc.), or through some other suitable method. The processor 400 may be, for example, a controller, a microcontroller, a server processor, personal computer processor, a laptop computer processor, a mobile device processor, an application specific instruction set processor (ASIP), a network processor, or any other suitable processor. The processor 400 may be part of a welding power supply and/or in communication with a welding power supply, or may be separate entirely. When part of the welding power supply and/or in communication with the welding power supply, the processor 400 may be configured to set an appropriate wire speed and/or voltage. In some examples, the processor 400 may comprise a plurality of processors. In some examples, the processor 400 may be part of the sensor 190, or the sensor 190 may be part of the processor 400. In some examples, the processor 400 and/or sensor 190 may include and/or be in communication with a receiver, transmitter, and/or transceiver. In some examples, the processor 400 may assist the sensor 190 with its detections and/or determinations, and/or vice versa.

To set up the wire drive assembly 100 according to some examples of the present disclosure, a wire is pulled from a wire spool, which may or may not be part of a welding power supply, for example. The wire is guided through the inlet wire guide 130 and through the appropriate groove 210, 220, 230 of the drive roll 180. Thus, for example, if the wire is a solid wire with a 0.024" diameter solid wire, then the wire is fed into groove 210. If the wire is a flux-cored wire with a 0.035" diameter, then the wire is fed into the V-knurled groove 230. The wire is then fed into the liner extending from one end of the welding torch/gun assembly and passing through the welding gun/torch guides 200. The end of the welding torch/gun assembly rests against the outer welding gun/torch guide 200 and the welding torch/gun assembly is secured by the T-knob 195. The pressure roll lever 140 is moved to a closed position so that the wire is properly installed in the appropriate groove 210, 220, 230 of the drive roll 180. The pressure adjustment knob 150, which extends from the housing 110 of the wire drive assembly 100, can be brought down against the pressure roll lever 140. The pressure adjustment knob 150 can then be turned to set the drive roll pressure for consistent wire feed.

To set up the drive roll 180 before the installation of the wire according to some examples of the present disclosure, the drive roll 180 has slots 240 (e.g. pockets) that are lined up with the retaining pin 170 and pushed over the drive shaft 160. By pushing the drive roll 180 towards the wire drive assembly 100 and turning the drive roll 180, the retaining pin 170 can be secured into one of the slots 240. In some examples, one slot 240 might be used for 0.024" diameter solid wire; one slot 240 might be used for 0.030"-0.035" diameter solid wire; and one slot might be used for 0.030"-0.035" diameter flux-cored wire. By rotating the drive roll 180 into a corresponding slot 240, the drive roll 180 is moved up or down relative to the surface of the housing 110 of the wire drive assembly 100 so that the respective groove 210, 220, 230 is aligned with the output of the inlet wire guide 130.

Thus, for example, if 0.024" diameter solid wire is to be fed into the wire drive assembly 100, then the drive roll 180 should be pushed and rotated until the retaining pin 170 is secured in the corresponding slot 240. The drive roll 180 is configured such that, when the retaining pin 170 is secured in the slot 240 corresponding to the 0.024" diameter solid wire, the drive roll 180 is positioned such that the groove 210 configured for use with 0.024" diameter solid wire is aligned with the inlet wire guide 130 to receive the 0.024" diameter solid wire that will be fed from the inlet wire guide 130. If a different wire diameter and/or type of wire is to be used, then the drive roll 180 can be pushed in and turned until the retaining pin 170 is secured in one of the slots 240 corresponding to the different wire type and/or wire diameter. When the retaining pin 170 is secured in the selected slot 240, then the groove 210, 220, 230 corresponding to the different wire is positioned to receive the different wire.

In operation, according to some examples of the present disclosure, the sensor 190 is positioned and/or configured to detect and/or determine which diameter of wire and/or type of wire is being fed into the wire drive assembly 100. The sensor 190 may additionally, or alternatively, be configured to generate and/or transmit a signal that specifies which diameter of wire and/or type of wire is being fed into the wire drive assembly 100. In some examples, the sensor 190 may be positioned and/or configured to detect and/or determine a distance and/or a change in distance that indicates which slot 240 has been selected to secure the retaining pin 170 and/or which groove 210, 220, 230 has been selected to receive the incoming wire. Additionally, or alternatively, the sensor 190 may be configured to generate and/or transmit a signal specifying a distance and/or a change in distance that can be used to determine which slot 240 has been selected to secure the retaining pin 170 and/or which groove 210, 220, 230 has been selected to receive the incoming wire. The distance can be, for example, the distance between the sensor 190 and the drive roll 180 (e.g., a bottom surface of the drive roll 180); the distance between a surface of the housing 110 and the drive roll 180; and/or the distance between a predetermined point and the drive roll 180.

In some examples, the sensor 190 may be positioned and/or configured to detect and/or determine an angle (e.g., a rotational angle) and/or a change in angle that indicates which slot 240 has been selected to secure the retaining pin 170 and/or which groove 210, 220, 230 has been selected to receive the incoming wire. Additionally, or alternatively, the sensor 190 may be configured to generate and/or transmit a signal that specifies an angle (e.g., a rotational angle) and/or a change in angle that indicates which slot 240 has been selected to secure the retaining pin 170 and/or which groove 210, 220, 230 has been selected to receive the incoming wire. Thus, turning the drive roll 180 through a rotational angle with respect to one or more predetermined reference points and/or angles may be used to determine which slot 240 and/or groove 210, 220, 230 has been selected. The predetermined reference point(s) and/or angle(s) may be the slot used when the drive roll 180 is aligned with the retaining pin 170 and pushed on the drive shaft 160, one of the other known slots, the retaining pin 170, a logo and/or other marking on the drive roll 180, a logo and/or other marking on the housing 110, and/or an arbitrary reference point or angle.

In some examples, many of the welding parameters (e.g. workpiece material thickness, voltage, wire speed, wire diameter, etc.) can be determined and set up automatically, rather than manually setting up the drive roll and manually inputting welding parameters. For example, by setting up the drive roll for a particular wire with a particular diameter as described above, the sensor 190 can automatically determine the type of wire and/or the diameter of the wire. The sensor 190 may be in communication with the welding power supply and/or one or more processors 400 that may or may not be part of the welding power supply. The welding power supply and/or one or more processors 400 may automatically determine the appropriate wire speed for the particular wire type and wire diameter as indicated by the sensor 190. In some examples, the welding power supply and/or one or more processors 400 may automatically determine and/or set the appropriate wire speed based at least in part on the sensor 190 detected wire type and/or wire diameter. In some examples, the wire speed may be determined and/or set based on other variables as well. Then the operator can manually enter a workpiece material thickness (e.g., by turning a dial or entering a number) and the welding power supply and/or one or more processors 400 can automatically determine the appropriate voltage for the welding operation.

With fewer manual parameters that must be input by operators, the disclosed wire drive assembly 100 and/or welding power supply offers fewer opportunities for manual parameter input errors to occur. The disclosed wire drive assembly 100 may also reduce the time needed by an operator to set up an associated welding power supply. The wire drive assembly 100 may include a sensor to automatically detect the appropriate wire type and/or wire diameter when the wire is installed in the wire drive assembly 100. Thus, an operator may skip the step of manually setting the wire diameter by using a sensor 190 (e.g., a proximity sensor, one or more optical sensors, and/or any other sensor capable of determining a position of the drive roll 180) to detect the location of the drive roll 180 placement on the drive shaft 160 of the motor 120 (e.g., gear motor). The wire diameter and/or the wire speed may automatically be set when the wire is installed in the wire drive assembly 100. The operator would not have to separately and additionally input the wire diameter information (e.g., by turning a knob or entering numbers) and/or the wire speed information. In some examples, this may allow for more space on a front panel of the welding power supply and provide increased potentiometer resolution that can determine the resolution of wire feed speed of the welding power supply.

Because the retaining pin 170 is located in a consistent place on the length of the drive shaft 160 and because the slots 240 (e.g., pockets) are at specific depths in the drive roll 180, the retaining pin 170 sitting in one of the slots 240 determines which wire diameter setting and/or which type of wire is being set for the drive roll 180. The sensor 190 can detect a distance, a change in distance, an angle, and/or a change in angle and send a signal to a controller (e.g., one or more processors that may or may not be part of the welding power supply) indicating the wire diameter and/or the type of wire being used. The controller can then automatically determine and set a wire speed, for example.

Figure 5:
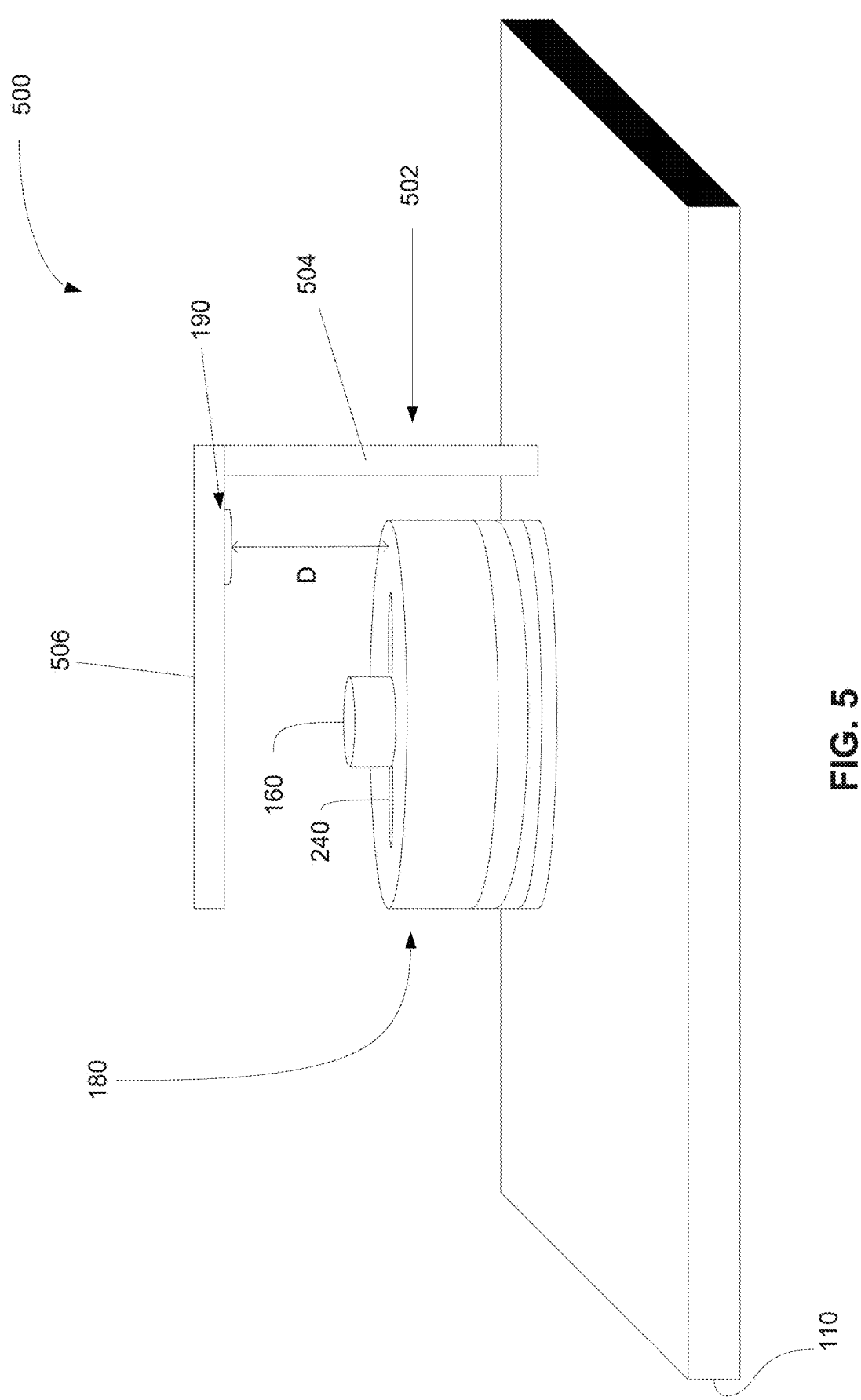
FIG. 5 shows a simplified perspective view of an alternative example of the wire drive assembly.

FIGS. 5 and 6 show alternative examples of the wire drive assembly 100. The diagrams of FIGS. 5 and 6 are simplified, with some components and/or detail omitted. FIG. 5 illustrates a wire drive assembly 500 with an alternative sensor 190 placement. As shown in FIG. 5, the sensor 190 may be coupled to a support 502 above and/or spaced from the drive roll 180, rather than being coupled to the housing 110. In some examples, the support 502 may be part of and/or coupled to the pressure roll lever 140. As shown in FIG. 5, the support 502 may include a pillar 504 that is coupled to the housing 110. An arm 506 of the support 502 may be coupled to the pillar 504. The arm 506 may extend over, adjacent, and/or parallel to the drive roll 180, at a spaced distance from the drive roll 180. The sensor 190 may be coupled to the arm 506 via appropriate means (e.g. fastener, screw, magnet, bolt, pin, latch, etc.).

The sensor 190 may be coupled to the arm 506 at a position where the sensor 190 may detect a distance and/or a change in distance between the sensor 190 and/or arm 506 and the drive roll 180. In some examples, the sensor 190 may be positioned such that the sensor 190 detects a distance D between the sensor 190 and/or arm 506 and a periphery of the drive roll 180, between the slots 240 and an edge of the drive roll 180. The detected and/or determined distance D and/or change in distance D may be used to determine which slot 240 and/or groove 210, 220, 230 has been selected. The sensor 190 may be configured to generate and/or transmit a signal that specifies the distance D and/or a change in distance D that indicates which slot 240 has been selected to secure the retaining pin 170 and/or which groove 210, 220, 230 has been selected to receive the incoming wire. The corresponding wire diameter and/or wire speed may automatically be set when the wire is installed in the wire drive assembly 100.

Figure 6A:
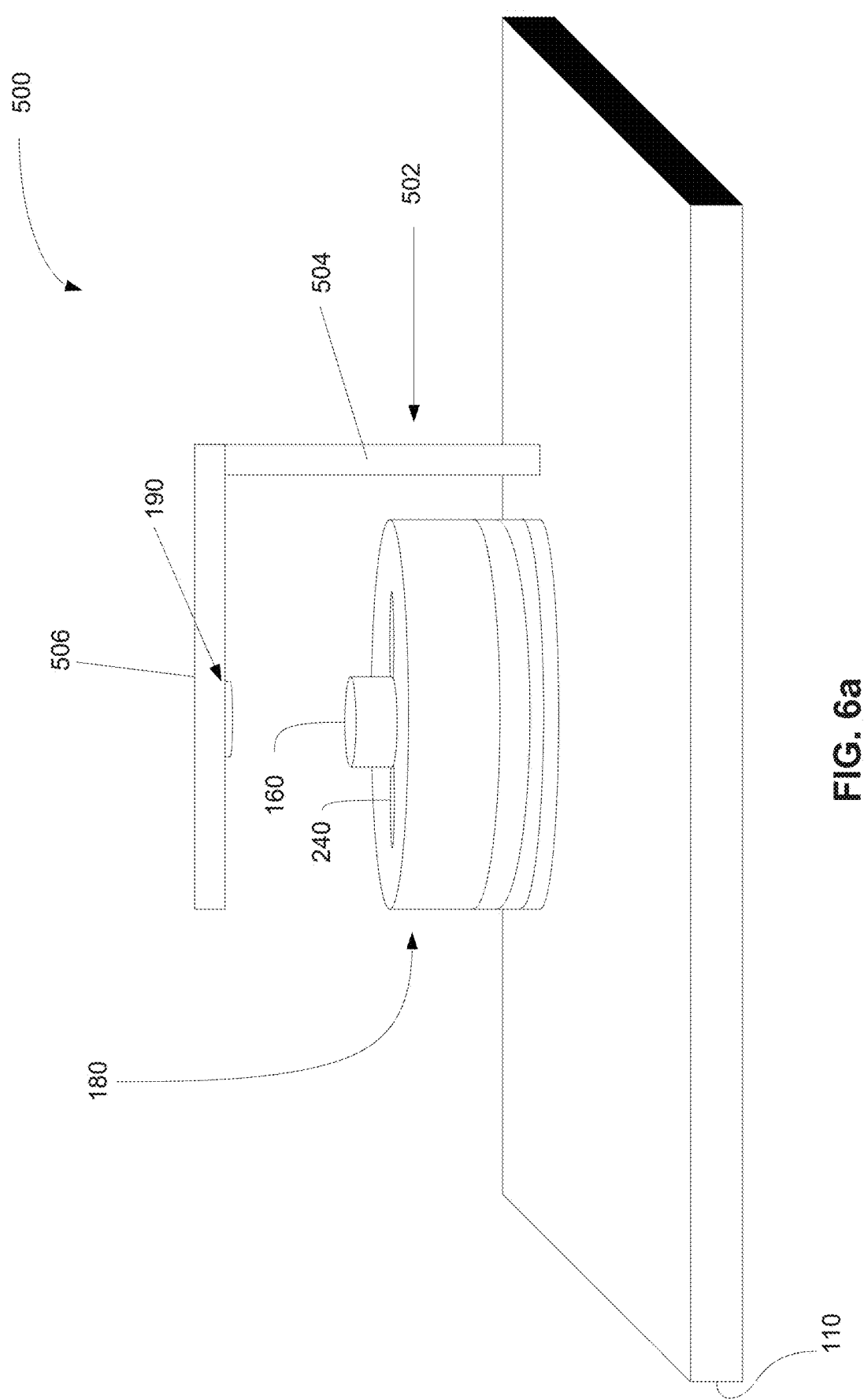
FIG. 6a shows a simplified perspective view of an alternative example of the wire drive assembly.

In some examples, the sensor 190 may be coupled to the arm 506 at a position where the sensor 190 may detect and/or determine an angle (e.g., a rotational angle) A and/or a change in angle A between the sensor 190 and/or arm 506 and the drive roll 180. For example, as shown in FIG. 6a, the sensor 190 may be positioned substantially aligned with the drive shaft 160. The sensor 190 may detect and/or determine an angle A with respect to one or more predetermined reference points RP and/or angles. For example, a predetermined reference point RP may be the slot used when the drive roll 180 is aligned with the retaining pin 170 and pushed on the drive shaft 160, one of the other known slots, the retaining pin 170, a logo and/or other marking on the housing 110, drive roll, and/or support 502, and/or an arbitrary reference point or angle. FIG. 6b shows an example illustration of the sensor 190 detecting an angle A between two references points RP1 and RP2. In the example of FIG. 6b, the first reference point RP1 may be a point at the end of the arm 506, approximately aligned with the center of the arm 506. The second reference point RP2 may be a point on the drive roll 180, such as a slot 290, marking, or some other reference point. The angle A may be detected and/or determined using the reference points RP1 and RP2. The detected and/or determined angle may be used to determine which slot 240 and/or groove 210, 220, 230 has been selected. The sensor 190 may be configured to generate and/or transmit a signal that specifies an angle A and/or a change in angle A that indicates which slot 240 has been selected to secure the retaining pin 170 and/or which groove 210, 220, 230 has been selected to receive the incoming wire. The corresponding wire diameter and/or wire speed may automatically be set when the wire is installed in the wire drive assembly 100.

In some examples, multiple sensors 190 may be used. For example, one sensor 190 may be positioned on the housing 110, while another sensor 190 is positioned on the support 502. In another example, one sensor 190 may be positioned on the support 502 to detect an angle and/or a change in angle, while another sensor 190 is positioned on the support 502 to detect a distance from the sensor 190 to the drive roll 180. In another example, one sensor 190 may be positioned on the housing 110 to detect angle, while another sensor 190 is positioned on the housing to detect distance. A third sensor 190 may be positioned on the support 502 to detect an angle and/or a change in angle, while a fourth sensor 190 is positioned on the support 502 to detect a distance from the sensor 190 to the drive roll 180.

Figure 7A:
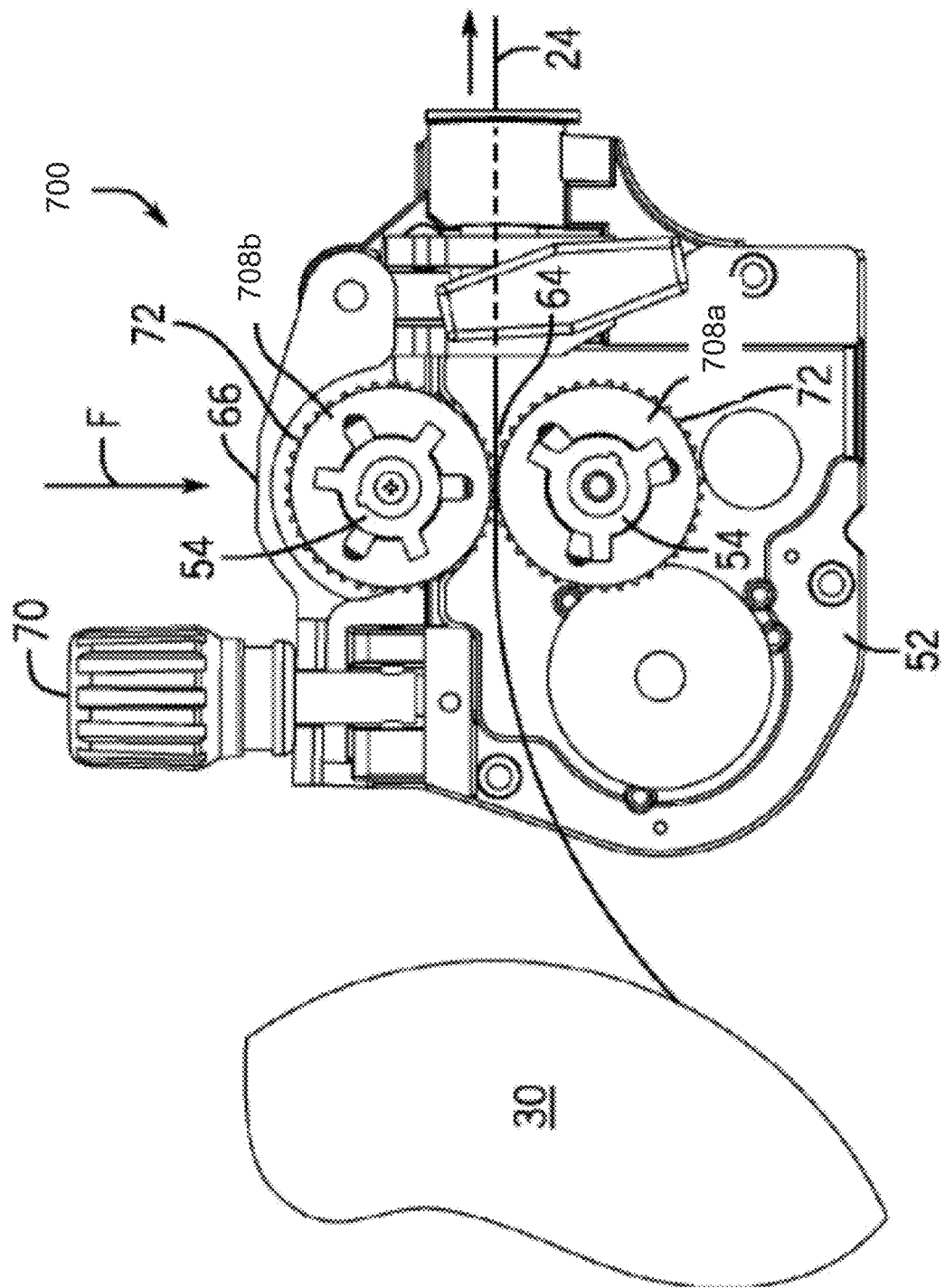
FIG. 7a shows an alternative example wire drive assembly.

FIGS. 7a through 7e illustrate another alternative example of a wire drive assembly 700. As shown in FIG. 7a, the wire drive assembly 700 may include two drive rolls 780: a first drive roll 780a and a second drive roll 780b. In some examples, the wire drive assembly 700 may include more than two drive rolls 780, such as three drive rolls 780, four drive rolls 780, six drive rolls 780, etc. Each drive roll 780 may be supported on a wire drive assembly housing 52. In some examples, the wire drive assembly housing 52 may comprise a drive casting. Both the drive rolls 780 are configured to rotate with respect to the wire drive assembly housing 52.

The drive assembly 700 may feed welding wire 24 from a spool 30 to a welding application. The first drive roll 780a may engage with the welding wire 24, applying a downward force F to the welding wire 24 for feeding the welding wire 24 between the drive rolls 48 and 50. This downward force F may generate traction between the drive rolls 780a and 780b, and the welding wire 24, effectively holding the welding wire 24 in alignment through a welding wire feed region 64 located between the feed rolls 48 and 50. As illustrated, the drive roll 780b is mounted on a clamp arm 66, which may be forced down by a tensioner (and/or pressure adjustment knob) 70. The tensioner 70 may apply a desired amount of compressive force F to the clamp arm 66, pushing the drive roll 780b toward the drive roll 780a. Adjustment of the compressive force F applied by the tensioner 70 may alter the size of the wire feed region 64, and the desired compressive force F may be determined based on the diameter and material properties of the welding wire 24 (e.g., steel versus aluminum welding wire).

One or both of the drive rolls 780a and 780b may be held within the wire drive assembly 32 via drive roll carriers 54. These drive roll carriers 54 may allow for relatively easy insertion and removal of the drive rolls 780a and 780b from the wire drive assembly 32. However, the drive roll carriers 54 may also prevent a sensor 190 from being placed below the drive rolls 190.

In some examples, these drive rolls 780a and 780b may be changed out occasionally. That is, the drive rolls 780a and 780b may be replaced or exchanged for ones configured to accommodate different sizes, types, (e.g. 0.024" diameter solid wire; 0.030"-0.035" diameter solid wire; 0.030"-0.035" diameter flux-cored wire) and/or materials of welding wire 24 (e.g. steel, aluminum, copper, etc.). In some examples, the drive rolls 780 may be removed, reversed, and reinserted to accommodate a different wire size, shape, and/or material. For example, the drive rolls 780 may include feed grooves 710 and/or 720. In some examples, the feed groove 710 may be a V-knurled groove for 0.045" diameter solid wire and the feed groove 720 may be a U groove for 0.030"-0.035" diameter solid wire and/or flux-cored wire. The drive rolls 780 may be removed, reversed, and reinserted to change from feed groove 710 to feed groove 720, and/or vice versa.

The drive roll carriers 54 may include gears 72, as illustrated, for syncing the rotation of the drive rolls 780a and 780b. Even if the drive rolls 780a and 780b themselves do not touch, the gears 72 upon which they are mounted may be engaged, such that the motion imparted from the motor to the drive roll 48 is also transferred to the corresponding drive roll 780b. In some embodiments, multiple sets of drive rolls 780 may be arranged on corresponding drive roll carriers 54 that are geared together via a gear assembly that receives mechanical power from a single motor. While both drive rolls 780a and 780b are shown as supported on the drive roll carriers 54, in other examples, one drive roll 780a may be supported on the drive roll carrier 54, while the other drive roll 780b may be a static roller that rotates in response to the rotation of the nearby drive roll 780a.

Figure 7B:
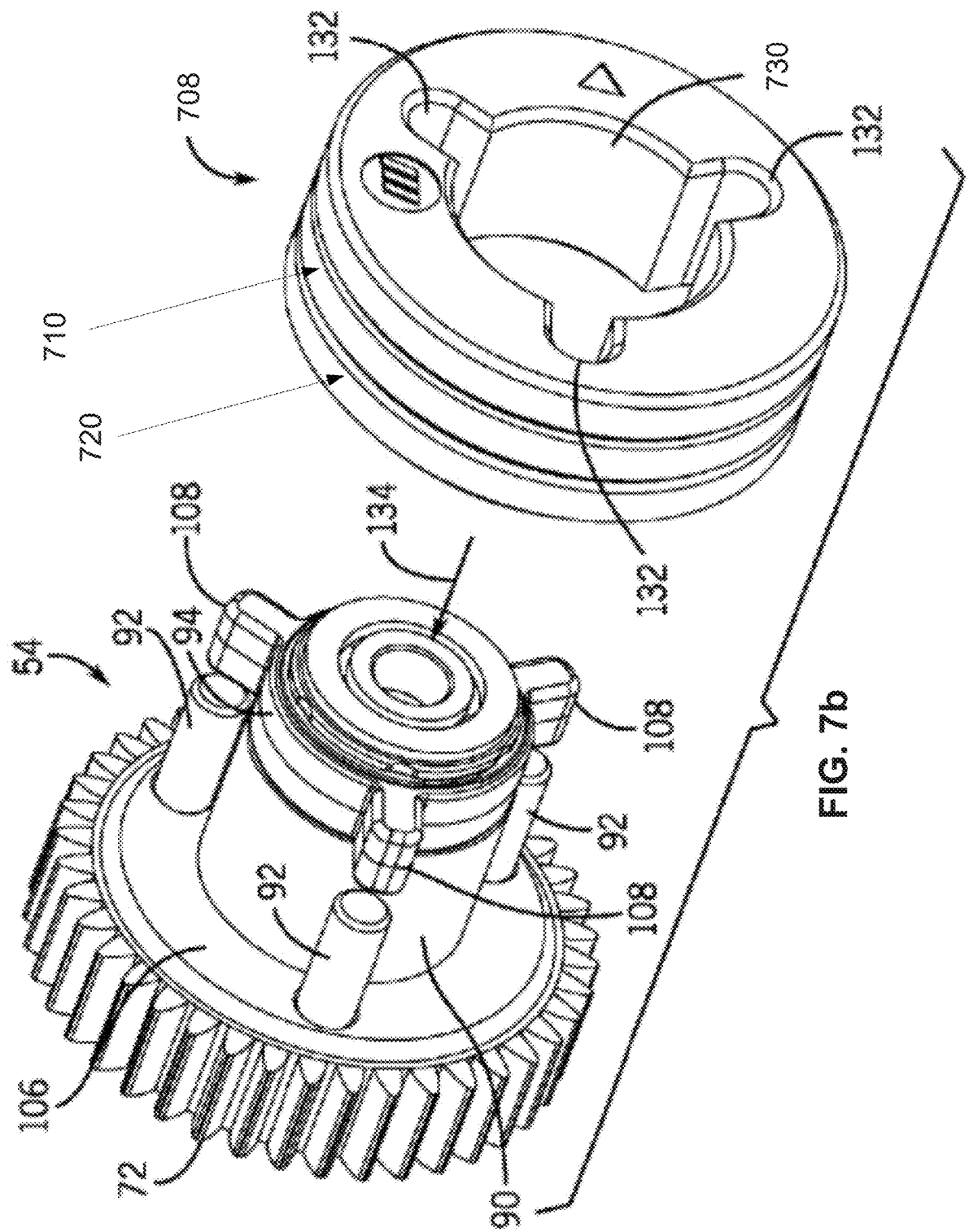

FIG. 7b shows of an example drive roll 780 and drive roll carrier 54. In the illustrated example, the drive roll carrier 54 includes the gear 72, a hub 90, drive roll engagement features 92, and a retainer 94. The gear 72 is configured to be rotated via the motor of the wire drive assembly 700. This rotation occurs about a rotational axis of the gear 72. The rotational axis of the gear 72 may be approximate to that of arrow 134. The hub 90 may be coupled to and extending axially (or longitudinally) from the gear 72. The rotational axis of the gear 72 may also represent a longitudinal axis of the hub 90.

Engagement features 92 are configured to engage the drive roll 780 and to urge rotation of the drive roll 780 as the gear 72 is rotated by the motor. The engagement features 92 are dowel pins in the illustrated example, although other types of engagement features may be used as well. These engagement features 92 may be coupled to the gear 72, extending axially (or longitudinally) outward from the gear 72 in a direction substantially parallel (e.g., within less than approximately 1-2 degrees) to the rotational axis. Although illustrated as having 3 engagement features 92, in other examples, there may be any desirable number (e.g., 1, 2, 4, 5, 6, or more) of the engagement features 92.

The retainer 94 is configured to be disposed around the hub 90 for retaining the drive roll 780 onto the drive roll carrier 54. The retainer 94 may include one or more alignment features that can be brought into or out of alignment with the engagement features 92. In the illustrated embodiment, these alignment features include three lobes 108 extending radially outward from the retainer 94. These lobes 108 are located approximately every 120 degrees about the outer circumference of the retainer 94, just as the engagement features 92 are configured to be disposed every 120 degrees around the hub 90. In this manner, all three of the lobes 108 may be brought into alignment with the engagement features 92 at the same time. In addition, the retainer may include one or more indexing features that align with corresponding indexing features of the hub 90 for locking the retainer 94 into different positions relative to the hub 90.

In some examples, the drive roll carrier 54 may be configured to facilitate loading and securing of the drive roll 780 onto the drive roll carrier 54. Specifically, the retainer 94 may be movable between a first position where the lobes 108 are aligned with the engagement features 92 and a second position where the lobes 108 are not aligned with the engagement features 92 (e.g., moved approximately 60 degrees out of alignment from the engagement features 92). To move the retainer 94 between these positions relative to the engagement features 92, the retainer 94 may be rotated about hub 90 such that the indexing feature 110 of the retainer 94 moves from interfacing with one indexing feature 102 to a subsequent indexing feature 102 of the hub 90. This movement of the retainer 94 relative to the hub 90 may be accomplished without moving the retainer 94 in a direction substantially parallel to the rotational axis 100. That is, the retainer 94 is not moved along the length or longitudinal axis of the hub 90 when being moved between different indexed positions.

Figure 7D:
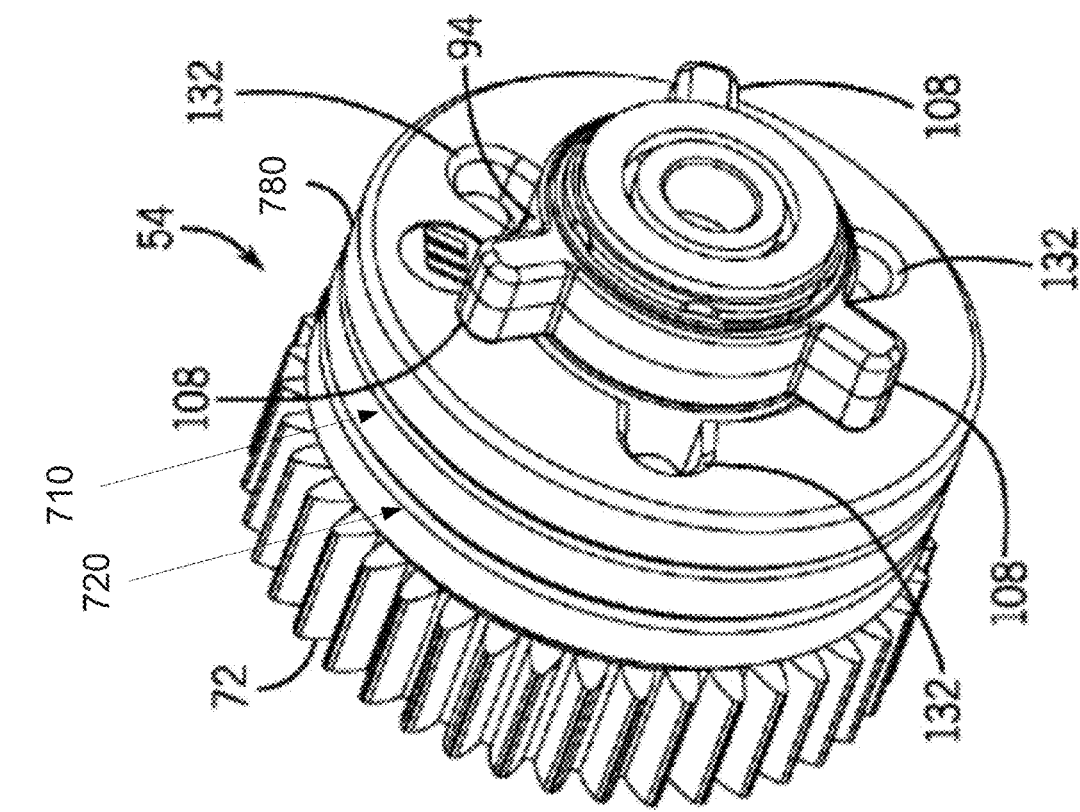
FIG. 7d is a perspective view of the drive roll carrier of FIG. 7b with the drive roll secured to the drive roll carrier.
Figure 7C:
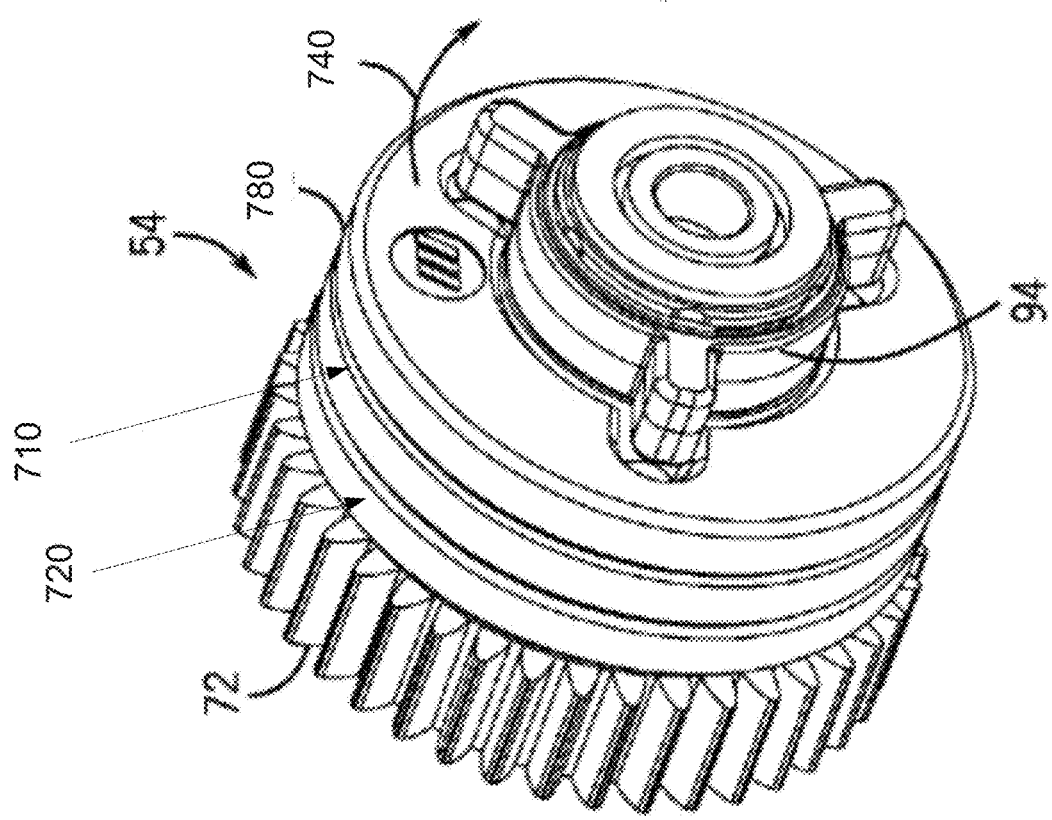
FIG. 7c is a perspective view of the drive roll carrier of FIG. 7b with the drive roll disposed on the drive roll carrier.

FIGS. 7c and 7d illustrate the fully assembled drive roll carrier 54 receiving, holding, and securing the drive roll 780 so that the drive roll 780 may be rotated as the drive roll carrier 54 is rotated. FIG. 7b is a perspective view of an embodiment of the drive roll carrier 54 receiving the drive roll 780. The illustrated drive roll 780 includes a bore 730 with three slots 132 protruding radially outward from the bore 730. As illustrated, the slots 132 may be circumferentially spaced at approximately every 120 degrees about the inner circumference of the bore 730. When the drive roll 780 is positioned on the drive roll carrier 54, the engagement features 92 may engage the slots 132 to urge rotation of the drive roll 780 as the drive roll carrier 54 is rotated. The drive roll 780 may be shaped differently in other examples.

In FIG. 7b, the drive roll carrier 54 is positioned for receiving the drive roll 780. More specifically, the retainer 94 is positioned about the hub 90 such that the lobes 108 of the retainer 94 are aligned with the engagement features 92 of the drive roll carrier 54. An operator may insert the drive roll 780 onto the drive roll carrier 54, as shown by arrow 134. During insertion, the slots 132 are aligned with both the lobes 108 and the engagement features 92 of the drive roll carrier 54. From the illustrated position, the drive roll carrier 54 may receive the drive roll 780 via the lobes 108. The lobes 108 may be aligned with the engagement features 92 such that the drive roll 780 can be transitioned from resting on the lobes 108 to resting on the engagement features 92 and abutting the surface 106 of the gear 72.

Once the drive roll 780 is positioned with the slots 132 resting on the engagement features 92, as shown in FIG. 7c, the retainer 94 may be transitioned from this first position to a second position. In the first position, the indexing features 102 and 110 have locked the retainer 94 in place relative to the hub 90 such that the lobes 108 are aligned with the engagement features 92. Once the drive roll 780 is positioned on the engagement features 92, however, it may be desirable to secure the drive roll 780 so that it does not move axially (or longitudinally) with respect to the drive roll carrier 54. Thus, the retainer 94 may be rotated, as shown by an arrow 740, to the next indexing point relative to the hub 90, in order to secure the drive roll 780 onto the drive roll carrier 54. As noted above, the retainer 94 may be repositioned via rotation about the hub 90, without being translated in an axial (or longitudinal) direction along the length of the hub 90.

FIG. 7d shows the drive roll carrier 54 positioned such that the drive roll 780 is secured onto the drive roll carrier 54. The retainer 94 is disposed in the second position relative to the hub 90 such that the lobes 108 of the retainer 94 are not aligned with the engagement features 92, which are engaged with the slots 132 of the drive roll 780. In the second position, the indexing features 102 and 110 have locked the retainer 94 in place relative to the hub 90 such that the lobes 108 are in a staggered (or non-aligned) position relative the engagement features 92. Thus, the drive roll 780 cannot slide axially (or longitudinally) off of the drive roll carrier 54, and the drive roll 780 is securely engaged by the drive roll carrier 54. If an operator desires to remove the drive roll 780, the operator may turn the retainer 94 back to the prior indexing position, or to another indexing position where the lobes 108 are aligned with the engagement features 92.

Figure 7E:
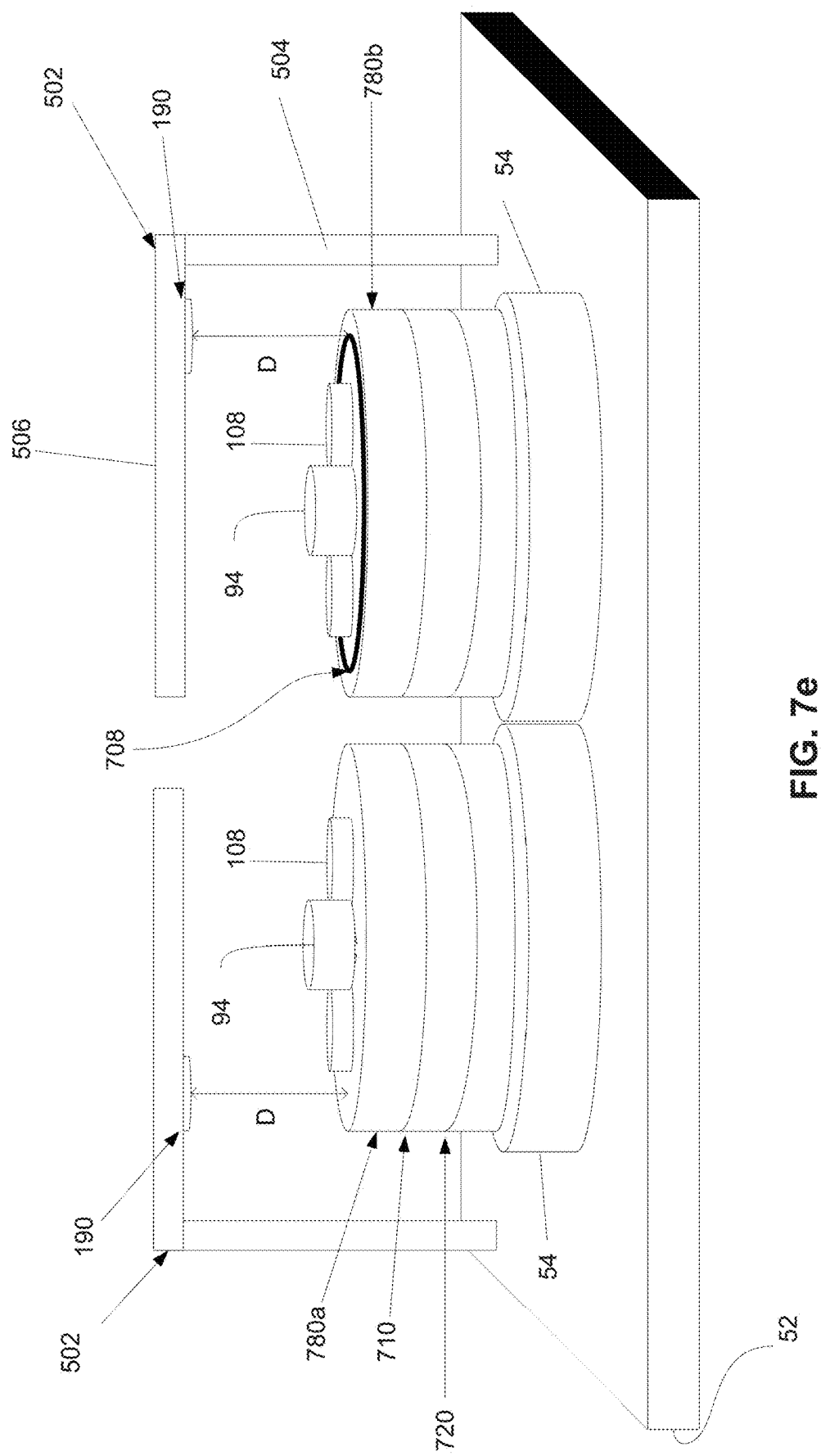
FIG. 7e is a simplified perspective view of the wire drive assembly of FIG. 7a with a sensor.

FIG. 7e illustrates the wire drive assembly 700 with a sensor 190. The diagram of FIG. 7e is simplified, with some components and/or detail omitted. As in FIGS. 5 and 6a, the sensor 190 may be coupled to a support 502 above and/or spaced from the drive roll 180, rather than being coupled to the housing 110. As shown in FIG. 5, the support 502 may include a pillar 504 that is coupled to the housing 110. In some examples, the support 502 may be part of and/or coupled to the clamp arm 66. An arm 506 of the support 502 is coupled to the pillar 504. The arm 506 extends over and/or parallel to the drive roll 180, at a spaced distance from the drive roll 180. The sensor 190 may be coupled to the arm 506 via appropriate means (e.g. fastener, screw, magnet, bolt, pin, latch, etc.).

In some examples, a recessed groove 508 may be formed on the top of one or both of the drive rolls 780, and the sensor 190 may be positioned such that the sensor 190 detects a distance D between the sensor 190 (and/or arm 506) and the groove 708. In some examples, the groove 508 may instead be formed as a raised ridge 508, and the sensor 190 may be positioned such that the sensor 190 detects a distance D between the sensor 190 (and/or arm 506) and the ridge 508. The groove and/or ridge 508 may be positioned at a periphery of the drive roll 180, between the lobes 108 and slots 132, and an edge of the drive roll 780. In the example shown in FIG. 7e, only the drive roll 780b has a groove/ridge 708, while the drive roll 708a has no groove or ridge.

In some examples, one face and/or side of the drive roll 780 may have a groove, while the other side has a ridge. In some examples, one face and/or side of the drive roll 780 may have a groove/ridge 508, while the other side has a plain face with no groove/ridge 508. The groove/ridge 508 may help identify which groove 710, 720 is in operative use. In the system 700, the drive rolls 780 may have to be removed, reversed, and reinstalled in order to change the operative groove from groove 710 to groove 720, and/or vice versa. Thus, without the groove/ridge 508, the drive roll 780 might always be at the same distance D from the sensor 190, regardless of which groove 710, 720 was being used. With a groove/ridge 708 on one side of the drive roll 780, and no groove/ridge 708 (or a different depth/height groove/ridge 708) on the other side, the detected and/or determined distance D may be used to determine which groove 710, 720 has been selected as the operative groove. In some examples, each drive roll 780 and/or each face/side of each drive roll 780, may have a distance D from the sensor 190 in accordance with the wire size/diameter and/or wire type of its operative groove. The sensor 190 may be configured to generate and/or transmit a signal that specifies the distance D that indicates which drive roll and/or which groove 710, 720 has been selected to receive the incoming wire and the system may thereby automatically determine and/or set the appropriate size/diameter, type, and/or material of the wire.

In some examples, such as shown in FIG. 7e, each drive roll 708a, 708b may have a sensor 190 coupled to a support 502 for detecting a distance D between the sensor 190 and the drive roll 780. In some examples, only one drive roll 780 may have a may have a sensor 190 coupled to a support 502. In some examples, one drive roll 780 may have a sensor 190 coupled to a support 502, while another has a sensor coupled to the housing, such as in the weld drive assembly 100. In examples where more than one sensor 190 is used, one sensor 190 may be set as the master sensor 190, while one or more other sensors 190 are set as slave sensors 190, such that the configuration detected by the master sensor 190 may override any conflicting configuration detected by the slave sensor(s) 190. In some examples, the sensors 190 may be configured with different priorities, ranks, and/or grades, such that one sensor 190 may be master to a second sensor while also being slave to a third sensor. In some examples, the sensor 190 may be configured to detect and/or recognize certain markings and/or symbols (e.g. a logo, barcode, QR code, ID number, part number, etc.) on the drive roll 780 that indicates which drive roll 780 (and/or which side/face of the drive roll 780) is being used, which may in turn indicate what type groove 710, 720 is in use, and/or what size/diameter and/or type of wire is in use.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

The invention claimed is:

1. A wire drive assembly, comprising:
a drive roll having a plurality of configurations relating to receiving different types of wire on different grooves;
a sensor configured to detect an angle or a change in angle with respect to one or more reference points of the drive roll; and
a processor configured to determine which of the plurality of configurations has been set based on the angle or the change in angle through which the drive roll is rotated in setting one of the plurality of configurations.

2. The wire drive assembly according to claim 1, wherein the drive roll is configured to receive a wire having at least one of a wire diameter or a wire type, and wherein the sensor is further configured to detect at least one of the wire diameter or the wire type based on a distance to the drive roll.

3. The wire drive assembly according to claim 1, wherein the drive roll is configured with a first groove and a second groove, wherein the first groove is configured to receive a first wire having a first diameter, and wherein the second groove is configured to receive a second wire having a second diameter.

4. The wire drive assembly according to claim 3, wherein the processor is configured to determine whether the drive roll has been set to receive the first wire having the first diameter or the second wire having the second diameter based on the angle.

5. The wire drive assembly according to claim 1, wherein the drive roll is configured with a first groove and a second groove, wherein the first groove is configured to receive a first type of wire, and wherein the second groove is configured to receive a second type of wire.

6. The wire drive assembly according to claim 5, wherein the sensor is configured to detect whether the drive roll has been set to receive the first type of wire or the second type of wire based on the angle.

7. The wire drive assembly according to claim 6, wherein the first type of wire is a solid wire, and wherein the second type of wire is a flux-cored wire.

8. The wire drive assembly as defined in claim 1, wherein the sensor is further configured to detect the angle through which the drive roll is rotated with respect to at least one a reference angle.

9. The wire drive assembly according to claim 1, wherein the drive roll has a plurality of slots, and wherein each of the plurality of slots corresponds to one of the plurality of configurations.

10. The wire drive assembly according to claim 9, wherein the drive roll is installed on a drive shaft with a pin, and wherein the pin engages with one of the plurality of slots to set one of the plurality of configurations.

11. The wire drive assembly according to claim 10, wherein the drive roll is set at a particular location on the drive shaft when the pin engages with one of the plurality of slots.

* * * * *